(12) United States Patent
Jeong et al.

(10) Patent No.: US 9,399,374 B2
(45) Date of Patent: Jul. 26, 2016

(54) FILM FOR A TIRE INNER LINER AND PREPARATION METHOD THEREFOR

(71) Applicant: Kolon Industries, Inc., Gwacheon-si (KR)

(72) Inventors: Young-Han Jeong, Daegu (KR); So-Yeon Kwon, Busan (KR); Hyun Namgoong, Seoul (KR); Seong-Hun Kim, Gumi-si (KR)

(73) Assignee: KOLON INDUSTRIES, INC., Gwacheon-Si (KR)

( * ) Notice: Subject to any disclaimer, the term of this patent is extended or adjusted under 35 U.S.C. 154(b) by 625 days.

(21) Appl. No.: 13/803,735

(22) Filed: Mar. 14, 2013

(65) Prior Publication Data

US 2013/0192735 A1 Aug. 1, 2013

Related U.S. Application Data

(63) Continuation-in-part of application No. PCT/KR2012/005187, filed on Jun. 29, 2012.

(30) Foreign Application Priority Data

| Jun. 30, 2011 | (KR) | 10-2011-0064869 |
| Sep. 30, 2011 | (KR) | 10-2011-0100237 |
| Jun. 29, 2012 | (KR) | 10-2012-0070630 |
| Jun. 29, 2012 | (KR) | 10-2012-0070631 |

(51) Int. Cl.
| B32B 27/08 | (2006.01) |
| B32B 27/34 | (2006.01) |
| B60C 5/14 | (2006.01) |
| B60C 1/00 | (2006.01) |
| B29D 30/06 | (2006.01) |

(52) U.S. Cl.
CPC .......... *B60C 1/0008* (2013.04); *B29D 30/0681* (2013.01); *B29D 2030/0682* (2013.01); *B32B 27/08* (2013.01); *B32B 27/34* (2013.01); *B60C 5/14* (2013.01)

(58) Field of Classification Search
None
See application file for complete search history.

(56) References Cited

FOREIGN PATENT DOCUMENTS

| JP | 07-227527 | 8/1995 |
| JP | 10-044251 | 2/1998 |
| JP | 2007-126657 | 5/2007 |
| JP | 2008-049749 | 3/2008 |
| JP | 2009-132379 | 6/2009 |
| JP | 2010-013617 | 1/2010 |
| KR | 10-2005-0122461 | 12/2005 |
| KR | 1020080093056 | 10/2008 |
| KR | 1020120002496 | 1/2012 |

OTHER PUBLICATIONS

Machine translation of KR 10-2012-0002496A, Jan. 2012.*
International Search Report of Application No. PCT/KR2012/005187 (Jan. 24, 2013).

* cited by examiner

*Primary Examiner* — Ramsey Zacharia
(74) *Attorney, Agent, or Firm* — Lex IP Meister, PLLC

(57) ABSTRACT

Disclosed is a film for a tire inner liner including a base film layer having an absolute weight-average molecular weight of 50,000 to 1,000,000, and an adhesive layer, and a method for manufacturing the film for a tire inner liner. The film for a tire inner liner may exhibit excellent gas barrier properties while having a thin thickness and lighter weight, and thus improves fuel efficiency, allows easier construction during its preparation, has excellent mechanical properties including high durability and fatigue resistance, and provides excellent adhesive strength to a tire carcass layer.

12 Claims, 1 Drawing Sheet

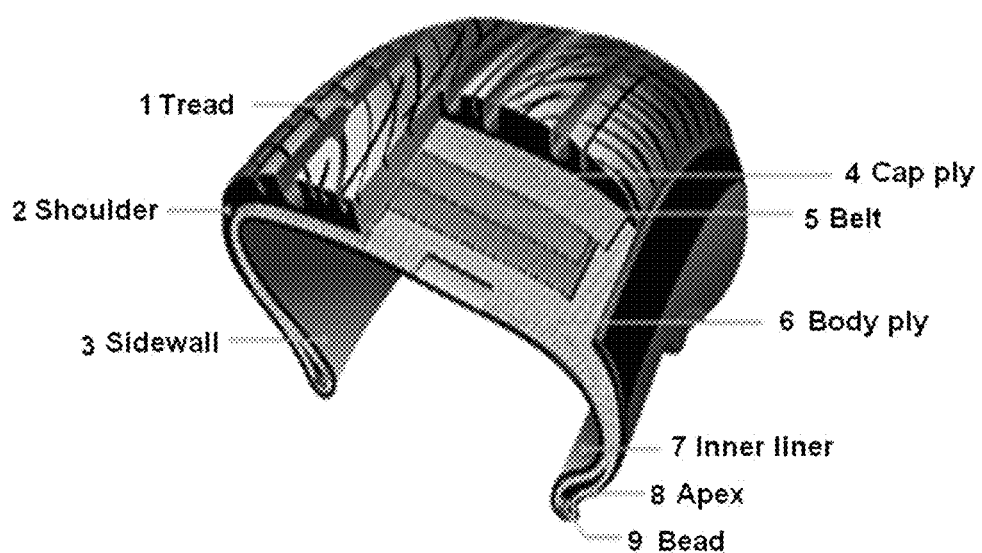
PRIOR ART

FILM FOR A TIRE INNER LINER AND PREPARATION METHOD THEREFOR

CROSS-REFERENCES TO RELATED APPLICATION

This application is a continuation-in-part application of PCT/KR2012/005187 filed on Jun. 29, 2012, which claims priority to Korean Patent Application No. 10-2011-0064869 filed on Jun. 30, 2011; Korean Patent Application No. 10-2011-0100237 filed on Sep. 30, 2011; Korean Patent Application No. 10-2012-0070630 filed on Jun. 29, 2012; and Korean Patent Application No. 10-2012-0070631 filed on Jun. 29, 2012, the contents of which are incorporated herein by reference.

FIELD OF THE INVENTION

A film for a tire inner liner and a method of preparing thereof are provided. In certain embodiments, a film for a tire inner liner has a thin thickness such that it exhibits superior gas-barrier properties with a lighter weight, and thus improves fuel efficiency, allows higher formability during its preparation, has excellent mechanical properties including high durability and fatigue resistance, and provides excellent adhesive strength to a tire carcass layer.

BACKGROUND OF THE INVENTION

A tire is designed to withstand the weight of an automobile, reduce impact force exerted by the road, and transfer driving force or braking force of an automobile to the ground. In general, a tire is a complex of fiber/steel/rubber, and has a structure as shown in FIG. 1.

Tread (1) is a part contacting the road. It should afford frictional forces required for driving/braking, have superior wear and heat resistance, and withstand external impact force.

Body ply, or carcass (6) is a cord layer inside the tire. It should be able to support the weight of an automobile, withstand impact force, and have high resistance to fatigue caused by bending and stretching during automobile operation.

Belt (5), mainly made up of a steel wire, is located between the body plies, adapted to reduce external impact force and maintains a wide contact area of the tread for vehicle running stability.

Side wall (3) is a rubber layer between a part below a shoulder (2) and bead (9). It protects the body ply (6).

Inner liner (7), in replacement of a tube, is located inside the tire, and allows a pneumatic tire by preventing air leakage.

Bead (9), a square or hexagonal wire bundle formed of rubber-coated steel wires, serves to position and fix the tire in a rim.

Cap ply (4) is a special cord located on a radial tire belt, and minimizes the belt movement during operation of an automobile.

Apex (8) is a triangular rubber filler designed to minimize the bead displacements, protect the beads by alleviating external impact force, and prevent air inflow during the tire construction.

Recently, a tubeless tire injected with a high air pressure of 30 to 40 psi has been commonly used. In such tire, an inner liner having high gas barrier properties is positioned on the inner layer of the carcass to prevent air leakage during automobile operation.

Moreover, as a main ingredient, a tire inner liner including a rubber such as butyl rubber or halobutyl rubber and the like having relatively low air permeability has been previously used. In order to achieve sufficient gas barrier properties for such inner liner, however, an increase in the amount of the rubber content or in the thickness of the inner liner thickness has been required. As a result, the total weight of the tire was increased, thereby decreasing fuel efficiency. In addition, during tire vulcanization or vehicle operation, air pockets were generated between the inner rubber of the carcass layer and the inner liner, or the deformation or deviation of the shapes or properties of the inner liner have been observed.

Various methods have been suggested to minimize the thickness and weight of the inner liner to increase fuel efficiency, and maintain the shape or properties of the inner liner during tire vulcanization or vehicle operation.

These methods, however, have limitations in providing excellent air permeability and formability of a tire while sufficiently decreasing the thickness and weight of the inner liner. Further, the use of an additional tie gum rubber for a strong bonding to a carcass layer inside the tire increases the weight of a tire and degrades fuel efficiency. The inner liner manufactured according to the methods has not shown sufficient fatigue resistance, generating cracks, for instance, from repeated deformations during the manufacturing process or operation.

Accordingly, there is a demand for the development of a film for a tire inner liner to provide a lightweight tire having a thinner thickness that may withstand repeated deformations with excellent properties including gas barrier properties, formability, and the like.

SUMMARY OF THE INVENTION

Disclosed herein is a film for a tire inner liner having a thin thickness and a method of preparing thereof such that it exhibits superior gas-barrier properties with a lighter weight, and thus improves fuel efficiency, allows higher formability during its preparation, has excellent mechanical properties including high durability and fatigue resistance, and provides excellent adhesive strength to a tire carcass layer.

An exemplary embodiment provides a film for a tire inner liner which may include a base film layer including a polyamide-based resin and a copolymer including a polyamide-based segment and a polyether-based segment; and an adhesive layer formed on at least one side of the base film layer and including a resorcinol-formalin-latex (RFL)-based adhesive, wherein the content of the polyether-based segment of the copolymer may be about 15 to about 50 wt % based on the total weight of the base film layer, and the base film layer may have an absolute weight-average molecular weight of about 50,000 to about 1,000,000.

The base film may have a specific refractive index increment (dn/dc) of about 0.04 to about 0.14 mL/g at a temperature of about 40° C. using a 0.02 M of tetramethyl ammonium chloride containing 1:4 mixed solvent of m-cresol and chloroform.

The polyamide-based resin may have a relative viscosity (sulfuric acid, 96% solution) of about 3.0 to about 3.5.

The copolymer including the polyamide-based segment and the polyether-based segment may have an absolute weight-average molecular weight of about 50,000 to about 1,000,000.

The polyamide-based segment of the copolymer may include a repeating unit of the following Chemical Formula 1 or Chemical Formula 2:

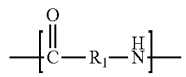
[Chemical Formula 1]

in Chemical Formula 1, $R_1$ may be a C1-20 liner or branched alkylene group or a C7-20 liner or branched arylalkylene group,

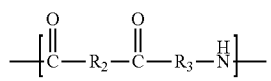
[Chemical Formula 2]

in Chemical Formula 2, $R_2$ may be a C1-20 linear or branched alkylene group, and $R_3$ may be a C1-20 linear or branched alkylene group or a C7-20 liner or branched arylalkylene group.

The polyether-based segment of the copolymer may include a repeating unit of the following Chemical Formula 3:

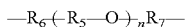
[Chemical Formula 3]

in Chemical Formula 3, $R_5$ may be a C1-10 linear or branched alkylene group, and n may be an integer of from 1 to 100, and $R_6$ and $R_7$ may be identical or different, and are independently a direct bond, —O—, —NH—, —COO—, or —CONH—.

A weight ratio of the polyamide-based segment and the polyether-based segment may be 6:4 to 3:7.

A weight ratio of the polyamide-based resin and the copolymer may be 6:4 to 3:7.

The base film layer may have a thickness of about 30 to about 300 μm, and the adhesive layer may have a thickness of about 0.1 to about 20 μm.

The base film layer may be an unstretched film.

The resorcinol-formalin-latex (RFL)-based adhesive may include about 2 to about 30 wt % of a condensate of resorcinol and formaldehyde, and about 68 to about 98 wt % of latex.

Another embodiment provides a method for preparing a film for a tire inner liner including melting and extruding a mixture of a polyamide-based resin and a copolymer including a polyamide-based segment and a polyether-based segment at a temperature in the range of about 230 to about 300° C. to form a base film layer having an absolute weight average molecular weight of about 50,000 to about 1,000,000; and forming an adhesive layer including a resorcinol-formalin-latex (RFL)-based adhesive on at least one side of the base film layer, wherein the content of the polyether-based segment in the copolymer may be about 15 to about 50 wt % based on the total weight of the base film layer.

The polyamide-based resin may have a relative viscosity (sulfuric acid, 96% solution) of about 3.0 to about 3.5, and the copolymer including the polyamide-based segment and the polyether-based segment may have an absolute weight-average molecular weight of about 50,000 to about 1,000,000.

A weight ratio of the polyamide-based segment and the polyether-based segment may be 6:4 to 3:7.

The base film may have a specific refractive index increment (dn/dc) of about 0.04 to about 0.14 mL/g at a temperature of about 40° C. using a 0.02 M of tetramethyl ammonium chloride containing 1:4 mixed solvent of m-cresol and chloroform.

The step of forming the base film layer may include extruding the mixture to a film having a thickness of about 30 to about 300 μm.

The step of forming the base film layer may include mixing the polyamide-based resin and the copolymer in a weight ratio of 6:4 to 3:7.

The step of forming the adhesive layer may include coating an adhesive including about 2 to about 30 wt % of a condensate of resorcinol and formaldehyde, and about 68 to about 98 wt % of latex, on at least one side of the base film layer to a thickness of about 0.1 to 20 μm.

The method may further include a step of solidifying the melted and extruded base film layer by cooling at a temperature of about 5 to 40° C.

Hereinafter, further embodiments will be described in detail.

BRIEF DESCRIPTION OF THE DRAWINGS

The exemplary embodiments will be more clearly understood from the following detailed description taken in conjunction with the accompanying drawings, where:

FIG. 1 schematically shows the structure of a pneumatic tire.

DETAILED DESCRIPTION OF THE INVENTION

The present invention will be described more fully hereinafter in the following detailed description of the invention, in which some but not all embodiments of the invention are described. This invention may be embodied in many different forms and should not be construed as limited to the embodiments set forth herein; rather, these embodiments are provided so that this disclosure will satisfy applicable legal requirements. According to one embodiment of the invention, there is provided a film for a tire inner liner including: a base film layer including a polyamide-based resin and a copolymer including a polyamide-based segment and a polyether-based segment; and an adhesive layer formed on at least one side of the base film layer and including a resorcinol-formalin-latex (RFL)-based adhesive, wherein the content of the polyether-based segment of the copolymer is about 15 to about 50 wt % based on the total weight of the base film layer, and the base film layer has an absolute weight average molecular weight of about 50,000 to about 1,000,000.

The base film layer having an absolute weight average molecular weight of about 50,000 to about 1,000,000 shows an excellent gas-barrier properties, and may have a thin thickness such that the weight of a tire may be lightened, thereby improving fuel efficiency. The film for a tire inner liner may also have excellent mechanical properties including high durability, high fatigue resistance, and excellent formability while having high heat resistance. Another aspect of the invention may provide an adhesive layer including a resorcinol-formalin-latex (RFL)-based adhesive formed on the base film layer, which may strengthen its adhesion force to a tire without the needs of applying an additional vulcanization process or undesirably increasing the thickness of the adhesive layer.

An absolute weight-average molecular weight of the base film layer may be between about 200,000 and about 1,000,000. In another embodiment, an absolute weight average molecular weight of the base film layer may be between about 80,000 and about 900,000, preferably about 200,000 and about 800,000. The base film having such absolute weight-average molecular weight may have a low modulus property with sufficient strength. Moreover, its degree of crystallinity may not relatively increase at a high temperature of 100° C. or more, and thus, the modulus property, elasticity, elasticity recovery rate, or the like is not significantly lowered and excellent formability may be secured even at the above temperature range. Further, a tire using the film for a tire inner liner including the base film layer may have superior mechanical properties including high durability, high fatigue resistance, and the like.

Generally, light scattering occurs in a solution including a polymer material because of the polymer material chain. Such scattering may be explained by the fact that the size of the polymer chain is similar to or smaller than the wavelength of light, and the polymer chains are polarized by an electric field of incident light. The light scattering may not be proportional to the amount of scatterer, and in case the equal amount of scatterers are present, scattering by large particles may be much stronger than scattering by small particles. With the application of these principles, as the degree of light scattering is influenced by the size of the particles, the characteristics of the polymer material such as molecular weight and the like may be identified.

For example, using the light scattering, an absolute weight-average molecular weight of a polymer material may be measured. Particularly, using the MALS (multiangle light scattering) system of Wyatt Company, parameters obtained in the measurement results may be applied to the Rayleigh-Gans-Debye equation to obtain the absolute weight-average molecular weight of the polymer material.

$$K^*C/R(\theta)=1/MP(\theta)+2A_2C \quad \text{<Equation 1: Rayleigh-Gans-Debye equation>}$$

Polymer materials interact with light to have a polarized charge, and then to radially scatter light. Equation 1 uses a principle that a charge transfer amount and a light emission amount are varied according to the polarizability of the polymer material. That is, from the amount of scattered light and angular variation measured by irradiating laser light to a solution including a polymer material and a solvent, molar mass and size of the polymer may be determined.

In Equation 1, M is molar mass, and is an absolute weight average molecular weight (Mw) for a polydispersed sample, $R_\theta$ is the excess Rayleigh ratio, $K^*=4\pi^2 n_0^2 (dn/dc)^2 \lambda_0^{-4} N_A^{-1}$, C is polymer concentration (g/ml) in the solution, and $A_2$ is the second virial coefficient. Further, in the $K^*$, $n_0$ is the refractive index of the solvent, $N_A$ is Avogadro's number, $\lambda_0$ is the wavelength of a light source under vacuum, $P(\theta)=R_\theta/R_0$, and $R_0$ is incident light.

In addition, dn/dc, a specific refractive index increment, refers to a change rate of the refractive index (dn) according to a concentration change (dc) of a dilute solution obtained by dissolving a specific polymer material in an organic solvent. The refractive index may be obtained by injecting the dilute solution into a flow cell of a differential refractometer, and the specific refractive index increment (dn/dc) may be calculated by measuring the change rate of the refractive index in a certain concentration change section.

According to Equation 1, intensity of scattered light is proportional to molecular weight and concentration, and thus intensity and concentration of scattered light is measured through the MALS system to obtain an absolute weight average molecular weight of a polymer material.

An absolute weight-average molecular weight is related to processability, formability, melt viscosity, or the like of a molded product such as a film manufactured using a polymer material. Thus, as the base film layer has an absolute weight-average molecular weight of about 50,000 to about 1,000,000, preferably about 80,000 to about 900,000, and more preferably about 200,000 to about 800,000, the strength and elongation at break of the tire inner liner film may be improved, the modulus property may be lowered, and formability, elasticity, and elasticity recovery rate may be improved. Also, when the base film layer has an absolute weight-average molecular weight within the above range, the film for a tire inner liner may exhibit a high gas-barrier properties with a thin thickness.

If the absolute weight average molecular weight of the base film layer is less than 50,000, the film for a tire inner liner may not secure sufficient strength, elongation at break, toughness, and the like, and thus may not have minimal mechanical property and formability required for application in the tire manufacturing process. In addition, the manufactured tire may not have sufficient gas barrier properties, durability, as well as fatigue resistance, and thus defects such as cracks on the inner liner may be generated during automobile operation.

If the absolute weight-average molecular weight of the base film is greater than 1,000,000, the modulus of the base film layer may excessively increase, leading to an increase in discharge pressure due to high viscosity during film processing. In such case, it may be difficult to maintain an uniform thickness, lowering both process efficiency and productivity, and sufficient formability may not be secured during tire processing. Moreover, a difference in modulus between the tire rubber and the inner liner may undesirably concentrate stress to the inner liner and generate heat to lower properties such as durability of the tire during automobile operation.

Meanwhile, the base film may have a specific refractive index increment (dn/dc) of about 0.04 to about 0.14 mL/g, or alternatively about 0.05 to about 0.13 mL/g. According to another embodiment, the above range may be measured at a temperature of about 40° C. using a 0.02 M of tetramethyl ammonium chloride containing 1:4 mixed solvent of m-cresol and chloroform.

The specific refractive index increment (dn/dc) means a change rate of the refractive index (dn) according to a concentration change (dc) of a dilute solution obtained by dissolving a specific polymer material in an organic solvent. The refractive index may be obtained by injecting the dilute solution into a flow cell of a differential refractometer, and the specific refractive index increment (dn/dc) may be calculated by measuring the change rate of the refractive index in a certain concentration change section.

The specific refractive index increment (dn/dc), which is an absolute characteristic value of a polymer material, is determined by the size of the polymer material, and a difference in a refractive index between the polymer material and an organic solvent. Generally, light scattering occurs in a solution including a polymer material because of the polymer material chain. Such scattering may be explained by the fact that the size of the polymer chain is similar to or smaller than the wavelength of light, and the polymer chains are polarized by an electric field of incident light. The light scattering may not be proportional to the amount of scatterer, and in case the equal amount of scatterers are present, scattering by large particles may be much stronger than scattering by small particles. With the application of these principles, as the degree of light scattering is influenced by the size of the particles, the characteristics of the polymer material such as molecular weight and the like may be identified.

The polymer material interacts with light and has a polarized charge to radially scatter light. Under the principle that charge transfer amount and light emission amount are varied according to the polarizability of the polymer material, the molar mass and size of the polymer may be determined from the amount of scattered light and angular variation measured by irradiating laser light to a solution including the polymer material and a solvent. Since the polymer material has a constant change rate of the refractive index in a certain concentration change section at a specific temperature under a dilute solution, the specific refractive index increment (dn/dc) is deemed to be the absolute characteristic value of specific polymer material.

The "0.02 M of tetramethyl ammonium chloride containing 1:4 mixed solvent of m-cresol and chloroform" refers to a solution prepared by adding tetramethyl ammonium chloride to a 1:4 mixed solvent of an m-cresol solution and a chloroform solution respectively having a concentration of 99% or more (substantially 100%) such that the concentration of tetramethyl ammonium chloride may become 0.02 M.

The specific refractive index increment (dn/dc) of the base film, which is measured under the above-explained conditions and solution, may be about 0.04 to about 0.14 mL/g, or alternatively may be about 0.05 to about 0.13 mL/g. When the base film exhibits the above specific refractive index increment (dn/dc), the film for a tire inner liner may have excellent properties including excellent gas-barrier properties, low modulus property, high elasticity recovery rate, and the like. Having a relatively thin thickness, it may also exhibit excellent gas-barrier properties compared to the previously known inner liner films, for example, a film using butyl rubber, thus promoting fuel efficiency and minimizing rotational resistance to enhance stability for high speed operation. If the specific refractive index increment (dn/dc) of the base film layer is less than 0.04 mL/g, oxygen permeability may deteriorate, and the modulus property due to elongation may become undesirably high, whereas if it is greater than 0.14 mL/g, the elasticity recovery rate may be relatively lowered to cause damages to a film during tire deformation.

Meanwhile, the base film layer may have a thickness of about 30 to about 300 μm, preferably about 40 to about 250 μm, and more preferably about 40 to about 200 μm. Therefore, the film for a tire inner liner according to one embodiment may have low air permeability, for example oxygen permeability of 200 cc/(m2·24 h·atm) or less while having a thin thickness compared to those previously known.

The above-explained properties of the film for a tire inner liner may be derived from the application of the base film layer manufactured using a copolymer including a polyether-based segment and a polyamide-based segment together with a polyamide-based resin.

Since the base film layer uses a copolymer including a polyether-based segment that affords an elastomeric property to a polyamide-based resin, it may simultaneously possess excellent gas-barrier properties as well as a relatively low modulus. If the thickness of the films are relatively equivalent, the properties inherent in the molecular chain of the polyamide-based resin included in the base film layer provide the resin with 10 to 20 times more superior gas barrier properties than that of butyl rubber, and the resin exhibits a lower modulus compared to other resins. The polyether-based segment in the copolymer may be bonded to or dispersed inbetween the polyamide-based segments or polyamide-based resin, thereby further lowering the modulus of the base film layer, and preventing stiffening of the base film layer, and crystallization at a high temperature.

The excellent gas barrier properties allow the base film layer to have low air permeability while having a thin thickness. In addition, a relatively low modulus of the polyamide-based resin compared to other resins provides an inner liner film with overall a relatively low modulus properties to improve tire formability, even if a copolymer including a polyether-based segment is applied together. Since the polyamide-based resin has sufficient heat resistance and chemical stability, it may prevent deformation or degeneration of the inner liner film from chemical substance exposures such as additives and the like, or from high temperature applied during a tire manufacturing process.

Furthermore, the polyamide-based resin may be used together with a copolymer including a polyamide-based segment and a polyether-based segment to increase its reactivity to an adhesive, such as, a resorcinol-formalin-latex (RFL)-based adhesive. The inner liner film may easily adhere to a carcass part, and an interface break caused by heat or repeated deformations during a tire manufacturing process, or vehicle operation may be avoided to afford sufficient fatigue resistance to the inner liner film.

The polyamide-based resin may have a relative viscosity (sulfuric acid, 96 solution) of about 3.0 to about 3.5, preferably about 3.2 to about 3.4. If the viscosity of the polyamide-based resin is less than 3.0, sufficient elongation may not be secured due to a reduction in toughness, generating damagesduring a tire manufacturing process or automobile operation, and the base film layer may not have properties including gas barrier properties, formability, or the like required for a tire inner liner film. If the viscosity of the polyamide-based resin is greater than 3.5, the modulus or viscosity of the manufactured base film layer may become unnecessarily high, and the tire inner liner may not have appropriate formability or elasticity.

The relative viscosity of the polyamide-based resin is measured using a sulfuric acid 96% solution at room temperature. Specifically, specimens of the polyamide-based resin (for example, a 0.025 g specimen) are dissolved in a sulfuric acid 96 solution at various concentrations to prepare two or more solutions for measurement (for example, polyamide-based resin specimens are dissolved in a sulfuric acid 96 solution at concentrations of 0.25 g/dL, 0.10 g/dL, and 0.05 g/dL to prepare 3 solutions for measurement), and then the relative viscosities of the solutions for measurement may be calculated using a viscosity tube at 25° C. (for example, a ratio of the average viscosity tube-passing time of the measurement solution to the passing time of the sulfuric acid 96% solution).

The polyamide-based resin in the base film layer may include a polyamide-based resin, for example, nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS; or N-alkoxy alkylate thereof, for example, a methoxy methylate of 6-nylon, a methoxy methylate of 6-6,0-nylon or a methoxy methylate of 612-nylon. In one embodiment, nylon 6, nylon 66, nylon 46, nylon 11, nylon 12, nylon 610, or nylon 612 may be preferable.

In the manufacturing process of the base film, the polyamide-based resin may be mixed with the above-explained copolymer following by melting to be included in the base film, or precursors of the polyamide-based resin such as monomers or oligomers and the like may be mixed with the above-explained copolymer together with initiators or a catalyst and the like to be included in the base film layer.

Since the copolymer including a polyamide-based segment and a polyether-based segment may bond to, or be dispersed inbetween the polyamide-based resin, it may further decrease the modulus of the base film, and prevent stiffening of the base film layer and crystallization at a high temperature. The inclusion of the copolymer in the base film layer results in a film for a tire inner liner having high elasticity or an elasticity recovery rate while securing excellent mechanical properties including durability, heat resistance, fatigue resistance, and the like. Hence, the inner liner film may exhibit excellent formability. Moreover, the physical properties or performance of a tire using the same may be minimally deteriorated from repeated deformations and high heat generated during automobile operation.

Meanwhile, if the content of the polyether-based segment of the copolymer is about 15 to about 50 wt %, preferably about 20 to about 45 wt %, and more preferably about 22 to about 40 wt %, based on the total weight of the base film layer, the film for a tire inner liner may exhibit excellent properties and performance. If the content of the polyether-based segment of the copolymer is less than 15 wt % based on the total weight of the base film layer, the modulus of the base film layer or tire inner liner film may increase to lower tire formability, or property deterioration due to repeated deformations may largely occur. If the content of the polyether-based segments of the copolymer is greater than 50 wt % based on the total weight of the base film layer, the gas barrier properties required for a tire inner liner may not become inferior, thus lowering tire performance. In addition, the inner liner may not easily adhere to a carcass layer due to lowered reactivity to an adhesive, and a uniform film may not be easily manufactured due to increased elasticity of the base film layer.

The polyether-based segment may be bonded to the polyamide-based segment or dispersed between the polyamide-based resins, and may prevent growth of large crystals in the base film layer during a tire manufacturing process or automobile operation, or prevent easy breakage of the base film layer.

The polyether-based segment may further lower the modulus of the tire inner liner film to increase the tire formability. For example, such modulus allows relatively easy elongation or deformation according to the shape of a tire without the needs for the application of excessive force. The polyether-based segment may prevent film stiffening at a low temperature and crystallization at a high temperature. Damages including tears to the inner liner film caused by constant deformations and the like may be further avoid, and the deformation recovery of the inner liner may be also improved to prevent wrinkle formations on the film due to permanent deformation. Overall, the polyether-based segment may improve durability of a tire or inner liner.

The polyamide-based segments may prevent a large increase in the modulus property while maintaining adequate mechanical properties of the copolymer. The base film layer including the segment may have low air permeability while having a thin thickness, sufficient heat resistance, and chemical stability.

The copolymer including a polyamide-based segment and a polyether-based segment may be obtained by reacting one or more polyamide-based monomers or oligomers and one or more polyether-based monomers or oligomers, or it may be obtained by a polymerization reaction or cross-linking reaction of a polymer including a polyamide-based segment and a polymer including a polyether-based segment.

The copolymer including a polyamide-based segment and a polyether-based segment may be a block copolymer wherein the segments are bonded while forming a block, or it may be a random copolymer wherein the segments are irregularly bonded. The copolymer including a polyamide-based segment and a polyether-based segment may be a copolymer including a product of polymerization of a polymer including a polyamide-based segment and a polymer including a polyether-based segment, or it may be a cross-linked copolymer including a product of a cross-linking reaction between a polymer including a polyamide-based segment and a polymer including a polyether-based segment.

Meanwhile, in the base film layer, the polyamide-based resin and the copolymer including a polyamide-based segment and a polyether-based segment may be uniformly mixed, or may be partly or wholly bonded through polymerization or cross-linking.

In case the copolymer including a polyamide-based segment and a polyether-based segment includes a product of polymerization or a cross-linking reaction between a polymer including a polyamide-based segment and a polymer including a polyether-based segment, the copolymer may include a polymer including a polyamide-based segment or a polymer including a polyether-based segment which do not participate in the polymerization or cross-linking reaction. Accordingly, in the base film, a polymer including a polyamide-based segment or a polymer including a polyether-based segment as well as the polymerization product or cross-linking reaction product may be mixed or bonded with other ingredients. In such case, the sum of the content of the polyether-based segment of the copolymer and the content of the polymer including the polyether-based segment may be about 15 to about 50 wt % based on the total weight of the base film layer, so as to optimize the required properties of the inner liner film.

The polyamide-based segment of the copolymer may include a repeating unit of the following Chemical Formula 1 or Chemical Formula 2.

[Chemical Formula 1]

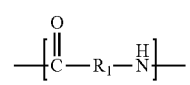

In Chemical Formula 1, $R_1$ is a C1-20 linear or branched alkylene group or a C7-20 linear or branched arylalkylene group.

[Chemical Formula 2]

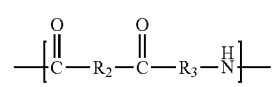

In Chemical Formula 2, $R_2$ is a C1-20 linear or branched alkylene group, and $R_3$ is a C1-20 linear or branched alkylene group or a C7-20 linear or branched arylalkylene group.

In case a base film layer is manufactured using a copolymer including a polyamide-based repeating unit and a polyether-based repeating unit, the polyamide-based segment may be the polyamide-based repeating unit. The polyamide-based segment may be derived from a polymer including a polyamide-based segment used in the manufacturing process of the base film, or one or more polyamide-based monomers or oligomers.

The polyether-based segment of the copolymer may include a repeating unit of the following Chemical Formula 3.

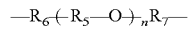 [Chemical Formula 3]

In Chemical Formula 3, $R_5$ is a C1-10 linear or branched alkylene group, n is an integer of from 1 to 100, and $R_6$ and $R_7$ may be identical or different, and are independently a direct bond, —O—, —NH—, —COO—, or —CONH—.

In case a base film layer is manufactured using a copolymer including a polyamide-based repeating unit and a polyether-based repeating unit, the polyether-based segment may be the polyether-based repeating unit. The polyether-based segment may be derived from a polymer including a polyether-based segment used in the manufacturing process of the base film, or polyether-based monomers or oligomers.

The copolymer including a polyamide-based segment and a polyether-based segment may have an absolute weight-average molecular weight of about 50,000 to about 1,000,000, preferably about 80,000 to about 900,000. If the absolute weight-average molecular weight of the copolymer is less than 50,000, the manufactured base film layer may not have sufficient mechanical properties required for its use in an inner liner film, and the film for a tire inner liner may not have a sufficient gas barrier properties. If the absolute weight-average molecular weight of the copolymer is greater than 1,000,000, the modulus or crystallinity of the base film layer may excessively increase during high temperature heating, and the elasticity or elasticity recovery rate required for an inner liner film may not be secured.

In a solution including the polymer material, light scattering occurs because of the polymer chain, and using the light scattering, an absolute weight-average molecular weight of the polymer material may be measured. Particularly, using a MALS (multiangle light scattering) system (Wyatt Company), parameters in the measurement results may be applied in the Rayleigh-Gans-Debye equation to obtain the absolute weight-average molecular weight of the polymer material.

$$K^*C/R(\theta)=1/MP(\theta)+2A_2C$$ <Equation 1: Rayleigh-Gans-Debye equation>

In Equation 1, M is molar mass, and is an absolute weight-average molecular weight (Mw) for a polydispersed sample, $R_\theta$ is the excess Rayleigh ratio, $K^*=4\pi^2 n_0^2 (dn/dc)^2 \lambda_0^{-4} N_A^{-1}$, C is polymer concentration (g/ml) in the solution, and $A_2$ is the second virial coefficient. Further, in the $K^*$, $n_0$ is the refractive index of the solvent, $N_A$ is Avogadro's number, $\lambda_0$ is the wavelength of a light source under vacuum, $P(\theta)=R_\theta/R_0$, and $R_0$ is incident light.

Meanwhile, the copolymer may include the polyamide-based segment and the polyether-based segment in the weight ratio of about 6:4 to about 3:7, preferably about 5:5 to about 4:6, while the content of the polyether-based segment is about 15 to about 50 wt % based on the total weight of the film.

As explained, if the content of the polyether-based segment is too low, the modulus of the base film layer or tire inner liner film may increase to lower formability of the tire, or properties may be largely degraded due to repeated deformations. On the other hand, if the content of the polyether-based segment is too high, the gas barrier properties of the film for a tire inner liner may be lowered, the inner liner may not easily adhere to a carcass layer due to lowered reactivity to adhesive, and a uniform film may not be easily manufactured due to increased elasticity of the base film layer.

In the base film layer, the polyamide-based resin and the above explained copolymer may be included in the weight ratio of about 6:4 to about 3:7, and preferably about 5:5 to about 4:6. If the content of the polyamide-based resin is too low, the density or gas barrier properties of the base film layer may be lowered. If the content of the polyamide-based resin is too high, the modulus of the base film layer may become excessively high or formability of the tire may be lowered, the polyamide-based resin may be crystallized under a high temperature environment during a tire manufacturing process or automobile operation, and cracks may be generated due to repeated deformations.

Meanwhile, the base film layer may be an unstretched film. If the base film layer is an unstretched film, it may have a low modulus and high strain, and thus it may be appropriately applied in a tire forming process during which high expansion is generated. Since crystallization hardly occurs in the unstretched film, damages such as cracks and the like may be prevented even if deformations repeatedly occur. Since the unstretched film is unlikely to have much difference in terms of its properties depending on the orientation in a specific direction, an inner liner having uniform properties may be obtained. As described in the following manufacturing method of a film for a tire inner liner, the base film may be manufactured in the form of an unstretched or non-oriented film by preventing the orientation formation in the base film layer, for example, by a viscosity control through optimization of melt-extrusion temperature, a modification of die standard, a control of the installation location of a cooling roller, a control of the installation location of an air knife, a control of the installation location of a pinning device (electrostatic charging device), a control of winding speed, and the like.

If an unstretched film is applied for the base film layer, a film for an inner liner may be easily prepared in a cylindrical- or sheet-type in a tire manufacturing process. According to one embodiment, in case an unstretched sheet-type film is applied for the base film layer, no separate film manufacturing facilities depending on the size of the tire is needed, and more importantly, physical impacts and wrinkles may be minimized during transfer and storage. In another embodiment, in case the base film is manufactured in a sheet type, a process of adding an adhesive layer may be more easily conducted, and damages, deformations, or the like generated during a manufacturing process due to a difference in standards or a tire forming drum may be prevented.

Meanwhile, the base film may further include additives such as a heat resistant oxidant, a heat stabilizer, an adhesion improving agent, or a mixture thereof. Examples of the heat resistant oxidant may include N,N'-hexamethylene-bis-(3,5-di-tert-butyl-4-hydroxy-hydrocinnamamide), for example, a commercialized product such as Irganox 1098, tetrakis[methylene(3,5-di-t-butyl-4-hydroxyhydrocinnamate)]methane, for example, a commercialized product such as Irganox 1010), or 4,4'-di-cumyl-di-phenyl-amine, for example, Naugard 445, and the like. Examples of the heat stabilizer may include benzoic acid, triacetonediamine, N,N'-bis-(2,2,6,6-tetramethyl-4-piperidyl)-1,3-benzenedicarboxamide, or the like. However, the additives are not limited thereto, and those known to be usable for a tire inner liner film may be used without specific limitations.

The adhesive layer including a resorcinol-formalin-latex (RFL)-based adhesive has excellent adhesion and adhesion maintenance to the base film layer and a tire carcass layer, and thus, a break of the interface between the inner liner film and the carcass layer, which is generated due to heat generated during a tire manufacturing process or vehicle operation, or repeated deformations, may be prevented to afford sufficient fatigue resistance to the inner liner film.

The above-explained properties of the adhesive layer result from inclusion of a specific resorcinol-formalin-latex (RFL)-based adhesive having a specific composition. A rubber-type tie gum, an adhesive for a tire inner liner, required an additional vulcanization process. To the contrary, since the adhesive layer includes a resorcinol-formalin-latex (RFL)-based adhesive having a specific composition, it has high reactivity and adhesion to the base film, and the base film and a tire carcass layer may be stably bonded by pressing under a high temperature heating condition without largely increasing the thickness. Thereby, lightening of the tire weight and improvement in fuel efficiency may be achieved, and a separation between the base film or inner liner layer and a carcass layer may be prevented even if deformations repeatedly occur during a tire manufacturing process or automobile operation. Since the adhesive layer may exhibit high fatigue resistance to physical/chemical deformations, deterioration of adhesion or the like may be minimized in a high temperature manufacturing process or automobile operationprocess during which mechanical deformations occur for a long period of time.

Furthermore, the resorcinol-formalin-latex (RFL)-based adhesive allows a cross-linking between latex and rubber to provide superior adhesion performance, while having a low curing degree because it is physically a latex polymerization product and thus is flexible like rubber. The chemical bonding between the methylol end group of a resorcinol-formalin polymerization product and the base film is also possible Thus, if the resorcinol-formalin-latex (RFL)-based adhesive is applied to the base film, sufficient adhesion may be achieved.

The resorcinol-formalin-latex (RFL)-based adhesive may include about 2 to about 32 wt %, preferably about 10 to about 20 wt %, of a condensate of resorcinol and formaldehyde, and about 68 to about 98 wt %, preferably about 80 to about 90 wt %, of latex.

The condensate of resorcinol and formaldehyde may be obtained by mixing resorcinol and formaldehyde in the mole ratio of about 1:0.3 to about 1:3.0, preferably about 1:0.5 to about 1:2.5, followed by conducting condensation. The condensate of resorcinol and formaldehyde may be included in the content of about 2 wt % or more based on the total weight of the adhesive layer for excellent adhesion, and it may be included in the content of about 32 wt % or less to secure optimum fatigue resistance.

The latex may be at least one selected from natural rubber latex, styrene/butadiene rubber latex, acrylonitrile/butadiene rubber latex, chloroprene rubber latex, styrene/butadiene/vinylpyridine rubber latex, and a mixture thereof. The latex may be included in the content of about 68 wt % or more based on the total weight of the adhesive layer for flexibility and effective cross-linking reaction with rubber, and it may be included in the content of about 98 wt % or less for a chemical reaction with the base film and stiffness of the adhesive layer.

The adhesive layer may further include at least one additive such as a surface tension control agent, an antifoaming agent, a filler, and the like. Although the surface tension control agent is applied for uniform coating of the adhesive layer, it may cause a decrease in adhesion when introduced in an excessive amount, and thus it may be included in the content of about 2 wt % or less, or about 0.0001 to about 2 wt %, preferably about 1.0 wt % or less, or about 0.0001 to about 0.5 wt %, based on the total weight of the adhesive layer. The surface tension control agent may be at least one selected from a sulfonic acid salt anionic surfactant, a sulfate ester surfactant, a carboxylic acid salt anionic surfactant, a phosphate ester anionic surfactant, a fluorine-containing surfactant, a silicone-based surfactant, a polysiloxane-based surfactant, and a combination thereof.

The adhesive layer may have a thickness of about 0.1 to about 20 μm, preferably about 0.1 to about 10 μm, more preferably about 0.2 to about 7 μm, still more preferably about 0.3 to about 5 μm, and it may be formed on one side or both sides of the film for a tire inner liner. If the thickness of the adhesive layer is too thin, the adhesive layer itself may become thinner during tire expansion, cross-linking adhesion between a carcass layer and the base film may be lowered, and stress may be concentrated on a part of the adhesive layer to lower the fatigue resistance property. If the thickness of the adhesive layer is too thick, a separation at the interface may occur to lower the fatigue resistance property. To adhere the inner liner film to a carcass layer of a tire, the adhesive layer is generally formed on one side of the base film, but in case a multi-layered inner liner film is applied, or an adhesion to rubber on both sides is required according to a tire forming method and construction design, for example when an inner liner film covers a bead part, the adhesive layer may be formed on both sides of the base film.

The film for a tire inner liner may maintain optimum internal pressure even after a long period of use. For example, when 90-day IPR (internal pressure retention) of a tire using the tire inner liner film is measured under a 21° C. and 101.3 kPa condition according to ASTM F 112-06, the internal pressure retention as shown in the following Equation 2 may become 95% or more, That is, the internal pressure decrease may be 5% or less. Thus, the film for a tire inner liner may be used to avoid automobile accidents including rollovers, and at the same to, promote fuel efficiency.

[Equation 2]
$$\text{Internal pressure retention (\%)} = \left\{ 1 - \frac{\text{Internal pressure of the tire at first evaluation} - \text{Internal pressure of the tire after standing for 90 days}}{\text{Internal pressure of the tire at first evaluation}} \right\} * 100$$

Meanwhile, the film for a tire inner liner may have adhesion of about 15 to about 40 kgf to a tire carcass layer. The adhesion may be measured by ASTM D 4394. Further, the standard deviation of adhesion of the tire inner liner film to a tire carcass layer may be 5 or less, and preferably 3 or less. Thus, the film for a tire inner liner may be uniformly and strongly bonded to a tire carcass layer.

The tire carcass layer (or body ply) is a frame of a tire that supports the load of a car body, and may refer to a structure including tire cord inside a certain rubber ingredient. In general, the rubber ingredient of the tire carcass layer bonds to a tire inner liner. The rubber ingredient used in the carcass layer is not specifically limited as long as it is commonly known material, and for example, it may include 30 wt % or more of synthetic rubber or natural rubber, various additives, and the like. As for the tire cord in the carcass layer, various natural fibers or rayon·nylon·polyester and Kevlar, and the like may be used, and steel cord formed by twisting steel wire may also be used.

The base film may have a maximum load per unit thickness of about 10 to about 35 gf/um at 100% elongation at room temperature. If too excessive load is generated when the base film is elongated by 100% at room temperature, it may be difficult to manufacture an appropriate tire shape with a low forming pressure by a tire forming machine, and thus the shape of a green tire may be distorted or a film may be torn apart. In such case, even if a tire is manufactured by modifying a forming machine or a forming method, external forces such as severe tension, compressive strain, and the like that may be generated during automobile operation may be concentrated on a specific area of the film due to an innate film property of stiffness. Thus, product quality problems such as crack generation in the film, tearing of the film, or the like may be present.

In general, a polyamide-based resin is known to be easily crystallized by the application of heat, but since the film for a tire inner liner includes a specific content of the polyether-based segments, the growth of crystals caused by internal heat or external deformation in the film may be prevented. Thus, the modulus or stiffness may not be largely changed by a long period vehicle operation, and cracks may also be minimized.

According to another embodiment of the invention, there is provided a method for preparing a film for a tire inner liner including melting and extruding a mixture of a polyamide-based resin, and a copolymer including a polyamide-based segment and a polyether-based segment at a temperature in the range about 230 to about 300° C. to form a base film layer having an absolute weight average molecular weight of about 50,000 to about 1,000,000, and forming an adhesive layer including a resorcinol-formalin-latex (RFL)-based adhesive on at least one side of the base film layer, wherein the content of the polyether-based segments in the copolymer is about 15 to about 50 wt % based on the total weight of the base film layer.

A film for a tire inner liner manufactured using a base film layer having an absolute weight average molecular weight of 50,000 to 1,000,000 that is formed using a copolymer including a specific content of a polyether-based segment and a polyamide-based resin may exhibit an excellent gas barrier properties with a thin thickness, such that the weight of a tire may be lightened weight, thereby improving fuel efficiency. The film also have excellent mechanical properties including high durability, high fatigue resistance, and excellent formability, while having high heat resistance.

In one embodiment, since the base film layer may have high reactivity to an adhesive (for example, a resorcinol-formalin-latex (RFL)-based adhesive) due to its properties, if an adhesive layer including a resorcinol-formalin-latex (RFL)-based adhesive is formed on the base film layer, it may be strongly bonded to a tire without applying an additional vulcanization process or increasing the thickness of the adhesive layer.

The base film layer may have an absolute weight-average molecular weight of about 50,000 to about 1,000,000, preferably about 80,000 to about 900,000. The details with respect to the absolute weight-average molecular weight are as explained above.

To fix the absolute weight-average molecular weight of the manufactured base film layer to about 50,000 to about 1,000,000, the following variables may be controlled: the relative viscosity or absolute weight average molecular weight of the polyamide-based resin, the composition or absolute weight-average molecular weight of the copolymer, the mixing ratio of the polyamide-based resin and copolymer, or the melting temperature, melting time, or the like of the mixture.

As explained above, the base film may have a specific refractive index increment (dn/dc) of about 0.04 to about 0.14 mL/g at a temperature of about 40° C. using a 0.02 M of tetramethyl ammonium chloride containing 1:4 mixed solvent of m-cresol and chloroform. The details of the specific refractive index increment (dn/dc) and the base film are as explained above.

As explained, the polyamide-based resin may have a relative viscosity (sulfuric acid, 96% solution) of about 3.0 to about 3.5, preferably about 3.2 to about 3.4. The copolymer may include the polyether-based segment in the amount of about 15 to about 50 wt %, preferably about 20 to about 45 wt %, and more preferably about 22 to about 40 wt %.

The base film may have a maximum load per unit thickness of about 10 to about 40 gf/um at 100% elongation. The film for a tire inner liner may have an adhesion force to a tire carcass layer of about 15 to about 40 kgf, as measured by ASTM D 4394, and air permeability of about 200 cc/(m²·24 h·atm) or less, as measured by ASTM D 3895. The details are as explained above.

The details of the polyamide-based resin and the copolymer including a polyamide-based segment and a polyether-based segment are as explained above.

The polyamide-based resin may be included in the base film by mixing or compounding it with the above-explained copolymer followed by melting, or it may be included in the base film by mixing the precursor of the polyamide-based resin such as monomers or oligomers and the like with the above-explained copolymer together with a reaction initiator, a catalyst, and the like.

The copolymer including a polyamide-based segment and a polyether-based segment may be included in the base film by mixing or compounding the copolymer itself with the polyamide-based resin followed by melting.

The base film layer may be formed by mixing or compounding a polymer including a polyamide-based segment and a polymer including a polyether-based segment, conducting polymerization or a cross-linking reaction, and mixing the product of the polymerization or cross-linking reaction with the polyamide-based resin followed by melting. The two kinds of polymers may be polymerized or cross-linked by mixing or compounding a polymer including a polyamide-based segment and a polymer including a polyether-based segment, and mixing the mixture or compounded substance with a polyamide-based resin followed by melting to form the base film layer.

In the base film layer, the polyamide-based resin and the copolymer including the polyamide-based segment and polyether-based segment may be uniformly mixed, or partially or wholly bonded through polymerization or cross-linking.

Meanwhile, in the step of forming the base film layer, to extrude a film having a more uniform thickness, the copolymer and the polyamide-based resin may be controlled so as to have a uniform size. Controlling the sizes of the copolymer and the polyamide-based resin may be achieved by uniformly mixing them in the step of mixing, in the step of maintaining them within a feeder at a constant temperature, or in the step of melting and extruding so as to prevent the copolymer and the polyamide-based resin from becoming excessively large by, for example, agglomeration, and thus a base film having a more uniform thickness may be formed.

If the copolymer and the polyamide-based resin have similar sizes, agglomeration of raw material chips or generation of non-uniform shapes or areas may be minimized in the subsequent mixing, melting, or extruding step, thereby forming a base film layer having a uniform thickness throughout the film, though the sizes of the copolymer and the polyamide-based resin that may be used in the manufacturing method are not specifically limited thereto.

The method for preparing the film for a tire inner liner may further include mixing the polyamide-based resin and the copolymer in the weight ratio of about 6:4 to about 3:7. If the content of the polyamide-based resin is too low, the density or gas barrier properties of the base film layer may be lowered. If the content of the polyamide-based resin is too high, the modulus of the base film layer may become too high, or formability of a tire may be lowered, the polyamide-based resin may be crystallized under a high temperature environment during a tire manufacturing process or automobile operation, and cracks may be generated due to repeated deformations. In the mixing step, equipments or methods generally well known for mixing a polymer resin may be used without specific limitations.

The polyamide-based resin and the copolymer may be introduced into a feeder after they are mixed, or may be sequentially or simultaneously introduced into a feeder and mixed.

As explained above, the copolymer may include a polyamide-based segment and a polyether-based segment in the weight ratio of about 6:4 to about 3:7.

A mixture of the polyamide-based resin and the copolymer may be supplied to an extrusion die through a feeder maintained at a specific temperature, for example, at a temperature of about 50 to about 100° C. Since the feeder is maintained at a temperature of about 50 to about 100° C., the mixture of the polyamide-based resin and the copolymer may have properties including appropriate viscosity and the like, and thus may be easily moved to other parts of the extrusion die or extruder, so defective feeding that is generated by agglomeration of the mixture and the like may be prevented, and a more uniform base film may be formed in the subsequent melting and extruding process. The feeder functions for supplying raw materials introduced in an extruder to the extrusion die or other parts, and the constitution is not specifically limited, but it may be a common feeder included in an extruder for preparing a polymer resin.

By melting and extruding the mixture supplied to the extrusion die through the feeder at about 230 to about 300° C., a base film layer may be formed. The melting temperature may be about 230 to about 300° C., and preferably about 240 to about 280° C. The melting temperature should be higher than the melting point of the polyamide-based compound, but if it is too high, carbonization or decomposition may occur to lower properties of a film, and bonding between the polyether-based resins may occur or orientation may be generated along the fiber arrangement direction, which may be unfavorable for manufacturing an unstretched film.

As the extrusion die, those known to be usable for extruding a polymer resin may be used without specific limitations, but a T-type die may be preferably used so that the thickness of the base film may become more uniform or orientation may not be generated in the base film.

The step of forming the base film layer may include extruding a mixture of the polyamide-based resin and the copolymer including a polyamide-based segment and a polyether-based segment to a film with a thickness of about 30 to about 300 μm. The thickness of the manufactured film may be controlled by controlling extrusion conditions, for example, the discharge rate of the extruder or the gap of extrusion die, or by modifying the winding speed in the cooling process or the recovery process of the extrudate.

To control the thickness of the base film layer uniformly in the range of about 30 to about 300 μm, the die gap of the extrusion die may be controlled to be about 0.3 to about 1.5 mm. In the step of forming the base film, if the die gap is too small, shear pressure and shear stress in the melting-extrusion process may become too high, and thus the uniform shape of the extruded film may not be formed and productivity may be lowered. If the die gap is too large, stretching of the extruded film may largely occur to generate orientation, and properties of the manufactured based film exhibited in the longitudinal direction may be noticeably different from those in the transverse direction.

Furthermore, the thickness of the prepared base film may be continuously measured, and the measurement results may be monitored to control the one or more parts of the extrusion die such as a lip gap adjustment bolt of the T-die, where a non-uniform thickness appears to reduce deviations from the standard base film, thereby obtaining a film having a uniform thickness. The measurement of the film thickness-feed back-control of the extrusion die may constitute an automated process step using an automated system, for example an Auto Die system and the like.

Meanwhile, the manufacturing method of the film for a tire inner liner may further include a step of solidifying the base film layer formed through melting and extrusion in a cooling part maintained at a temperature of about 5 to about 40° C., and preferably about 10 to about 30° C.

By solidifying the base film layer formed through melting and extrusion in a cooling part while maintaining a temperature of about 5 to about 40° C., a film with a more uniform thickness may be provided. If the base film layer formed through melting and extrusion is folded or attached to a cooling part maintained at an appropriate temperature, the formation of orientation may be substantially avoided, and the base film layer may be provided as an unstretched film.

The solidifying step may include uniformly attaching the base film formed through melting and extrusion to a cooling roll maintained at a temperature of about 5 to about 40° C., using an air knife, an air nozzle, an electrostatic charging device (pinning device), or a combination thereof.

In the solidifying step, by attaching the base film formed through melting and extrusion to a cooling roll using an air knife, an air nozzle, an electrostatic charging device (pinning device), or a combination thereof, blowing of the base film layer after extrusion, partially non-uniform cooling, or the like may be prevented, and the formation of areas having a relatively thick or thin thickness deviating from the uniform thickness of surrounding parts in the film may be substantially avoided.

The molten material extruded under specific die gap conditions may be attached or folded to a cooling roll installed at a horizontal distance of about 10 to about 150 mm, and preferably about 20 to about 120 mm from the die outlet, to eliminate stretching and orientation. The horizontal distance from the die outlet to the cooling roll may be a distance between the die outlet and a point where discharged molten material is folded to the cooling roll. If the linear distance between the die outlet and the cooling roll attaching point of the molten film is too small, uniform flow of extrusion of the resin may be disturbed and the film may be cooled in a non-uniform manner, and if the distance is too large, inhibition of film stretching may not be achieved.

In the step of forming the base film, except for the above-explained steps and conditions, film extrusion conditions commonly used for manufacturing of a polymer film, for example, screw diameter, screw rotation speed, line speed, and the like may be appropriately selected.

Meanwhile, the manufacturing method of the film for a tire inner liner may include a step of forming an adhesive layer including a resorcinol-formalin-latex (RFL)-based adhesive on at least one side of the base film layer.

The adhesive layer including the resorcinol-formalin-latex (RFL)-based adhesive may be formed by coating the resorcinol-formalin-latex (RFL)-based adhesive on one side of the base film layer, or by laminating an adhesive film including the resorcinol-formalin-latex (RFL)-based adhesive on one side of the base film layer.

The step of forming the adhesive layer may be progressed by coating the resorcinol-formalin-latex (RFL)-based adhesive on one side or both sides of the base film followed by drying. The formed adhesive layer may have a thickness of about 0.1 to about 20 μm, and preferably about 0.1 to about 10 μm. The resorcinol-formalin-latex (RFL)-based adhesive may include about 2 to about 32 wt % of a condensate of resorcinol and formaldehyde, and about 68 to about 98 wt %, preferably about 80 to about 90 wt %, of latex.

The details of the resorcinol-formalin-latex (RFL)-based adhesive with the above specific composition are as explained above.

Commonly used coating methods or apparatuses may be used to coat the adhesive without specific limitations. For example, knife coating, bar coating, gravure coating or spraying, or immersion may be used, and knife coating, gravure coating, or bar coating may be used for uniform coating of the adhesive.

After forming the adhesive layer on one side or both sides of the base film, drying and adhesive reactions may be simultaneously progressed, but heat treatment may be conducted after drying considering the reactivity of the adhesive. Further, the formation of the adhesive layer and drying and heat treatment may be applied multiple times for the adjustment of the thickness of the adhesive layer, or for the application of a multi-layered adhesive. After coating the adhesive on the base film, heat treatment may be conducted by solidifying and reacting at the range of about 100 to 150° C. for approximately 30 seconds to 3 minutes.

In the step of forming the copolymer or mixture, or in the step of melting and extruding the copolymer, additives such as a heat resistant antioxidant, heat stabilizer, or the like may be additionally added. The details of the additives are as explained above.

Hereinafter, exemplary examples are presented, but these examples are only to illustrate the invention and the scope of the invention is not limited thereto.

Examples 1 to 6

Manufacture of a Film for a Tire Inner Liner

Example 1

(1) Manufacture of a Base Film 50 wt % of a polyamide-based resin (nylon 6) with a relative viscosity (sulfuric acid, 96% solution) of 3.3 and 50 wt % of a copolymer resin having an absolute weight-average molecular weight of 145,000 (including 55 wt % of a polyamide-based repeating unit and 45 wt % of a polyether-based repeating unit) were mixed, and the mixture was extruded at 260° C. through a T-type die (die gap: 1.0 mm) while maintaining a uniform flow of the molten resin, and the molten resin was cooled and solidified in a film shape with a uniform thickness on the surface of a cooling roll maintained at 25° C. using an air knife, to obtain an unstretched base film having a thickness of 100 um at a speed of 15 m/min without passing through stretching and heat treatment sections.

(2) Coating of Adhesive

Resorcinol and formaldehyde were mixed at a mole ratio of 1:2, and then condensation was conducted to obtain a condensate of resorcinol and formaldehyde. 12 wt % of the condensate of resorcinol and formaldehyde and 88 wt % of styrene/butadiene-1,3/vinylpyridine latex were mixed to obtain a resorcinol/formaldehyde-latex (RFL)-based adhesive with a concentration of 20%.

The resorcinol/formaldehyde-latex (RFL)-based adhesive was coated on the base film to a thickness of 1 um using a gravure coater, and dried and reacted at 150° C. for 1 minute to form an adhesive layer.

Example 2

(1) Manufacture of a Base Film

An unstretched base film having a thickness of 100 um was obtained by the same method as Example 1, except that 40 wt % of a polyamide-based resin (nylon 6) with a relative viscosity (sulfuric acid, 96% solution) of 3.3 and 60 wt % of a copolymer resin having a weight-average molecular weight of 110,000 (including 40 wt % of a polyamide-based repeating unit and 60 wt % of a polyether-based repeating unit) were mixed.

(2) Coating of Adhesive

An adhesive layer was formed on the above-manufactured base film by the same method as Example 1.

Example 3

(1) Manufacture of a Base Film 50 wt % of a polyamide-based resin (nylon 6) with a relative viscosity (sulfuric acid, 96% solution) of 3.4 and 50 wt % of a copolymer resin having a weight-average molecular weight of 140,000 (including 50 wt % of a polyamide-based repeating unit and 50 wt % of a polyether-based repeating unit) were mixed, and extruded at 260 C. with a T-type die to manufacture an unstretched base film with a thickness of 80 μm at a speed of 30 m/min without passing through stretching and heat treatment sections.

(2) Preparation of an Adhesive Layer Composition

Resorcinol and formaldehyde were mixed at a mole ratio of 1:2, and then condensation was conducted to obtain a condensate of resorcinol and formaldehyde. 12 wt % of the condensate of resorcinol and formaldehyde and 88 wt % of styrene/1,3-butadiene/vinylpyridine latex were mixed to obtain a mixture of resorcinol/formaldehyde-latex at a concentration of 20%.

(3) Manufacture of a Film for a Tire Inner Liner

On both sides of the base film (200 mm×300 mm), the resorcinol-formalin-latex (RFL)-based adhesive layer composition was coated using a gravure coater. It was then dried and heat treated in a hot-air oven at 150° C. for 60 seconds to manufacture a film for a tire inner liner including an adhesive layers with a 1.0 μm thickness on both sides.

Example 4

(1) Manufacture of a Base Film 40 wt % of a polyamide-based resin (nylon 6) with a relative viscosity (sulfuric acid, 96% solution) of 3.4 and 60 wt % of a copolymer resin having a weight-average molecular weight of 140,000 (including 50 wt % of a polyamide-based repeating unit and 50 wt % of a polyether-based repeating unit) were mixed, and extruded at 260 C. with a T-type die to manufacture an unstretched base film with a thickness of 80 μm at a speed of 30 m/min without passing through stretching and heat treatment sections.

(2) Preparation of an Adhesive Layer Composition

A mixture of resorcinol/formaldehyde-latex at a concentration of 20% was obtained by the same method as Example 3.

(3) Manufacture of a Film for a Tire Inner Liner

A film for a tire inner liner including adhesive layers with a 1.0 μm thickness on both sides was manufactured by the same method as Example 3, except for using the above-manufactured base film.

Example 5

(1) Manufacture of a Base Film 30 wt % of a polyamide-based resin (nylon 6) with a relative viscosity (sulfuric acid, 96% solution) of 3.4 and 70 wt % of a copolymer resin having a weight-average molecular weight of 140,000 (including 50 wt % of a polyamide-based repeating unit and 50 wt % of a polyether-based repeating unit) were mixed, and extruded at 260 C. with a T-type die to manufacture an unstretched base film with a thickness of 80 µm at a speed of 30 m/min without passing through stretching and heat treatment sections.

(2) Preparation of an Adhesive Layer Composition

A mixture of resorcinol/formaldehyde-latex at a concentration of 20% was obtained by the same method as Example 3.

(3) Manufacture of a Film for a Tire Inner Liner

A film for a tire inner liner including adhesive layers with a 1.0 µm thickness on both sides was manufactured by the same method as Example 3, except for using the above-manufactured base film.

Example 6

(1) Manufacture of a Base Film

To a mixture of 70 wt % of c-caprolactam for polymerization of a resin for a base film and 30 wt % of polyoxyethylene diamine (Mw 2000), adipic acid was added in the same mole amount as the polyoxyethylene diamine, and the mixture was melted at 100° C. for 30 minutes under a nitrogen atmosphere. The molten liquid was heated at 250° C. for 3 hours, and the pressure was increased to 8 kg/cm² and maintained. The pressure was reduced to 1 kg/cm² for 1 hour.

The molten liquid was manufactured into a chip shape, and then the manufactured chip was extruded at 260° C. with a ring-shaped die to obtain an unstretched base film with a thickness of 100 µm at a speed of 30 m/min without passing through stretching and heat treatment sections.

(2) Preparation of an Adhesive Layer Composition

Resorcinol and formaldehyde were mixed at a mole ratio of 1:2, and then condensation was conducted to obtain a condensate of resorcinol and formaldehyde. 12 wt % of the condensate of resorcinol and formaldehyde and 88 wt % of styrene/butadiene-1,3/vinylpyridine latex were mixed to obtain a mixture of resorcinol/formaldehyde-latex with a concentration of 20%.

(3) Manufacture of a Film for a Tire Inner Liner

On both sides of the base film (200 mm×300 mm), the resorcinol-formalin-latex (RFL)-based adhesive composition was coated using a gravure coater. It was then dried and heat treated in a hot-air oven at 150° C. for 60 seconds to manufacture a film for a tire inner liner including adhesive layers with a 0.5 µm thickness on both sides of the base film.

Comparative Examples 1-7

Manufacture of a Film for a Tire Inner Liner

Comparative Example 1

(1) Manufacture of a Base Film

A base film was manufactured by the same method as Example 1, except that 60 wt % of a polyamide-based resin (nylon 6) with a relative viscosity (sulfuric acid, 96% solution) of 3.3 and 40 wt % of a copolymer resin having weight-average molecular weight of 120,000 (including 80 wt % of a polyamide-based repeating unit and 20 wt % of a polyether-based repeating unit) were mixed.

(2) Coating of Adhesive

An adhesive layer was formed on the manufactured base film by the same method as Example 1.

Comparative Example 2

(1) Manufacture of a Base Film

A base film was manufactured by the same method as Example 1, except that 20 wt % of a polyamide-based resin (nylon 6) with a relative viscosity (sulfuric acid, 96 solution) of 3.3 and 80 wt % of a copolymer resin having a weight-average molecular weight of 100,000 (including 20 wt % of a polyamide-based repeating unit and 80 wt % of a polyether-based repeating unit) were mixed.

(2) Coating of Adhesive

An adhesive layer was formed on the manufactured base film by the same method as Example 1.

Comparative Example 3

An unstretched film for a tire inner liner with a thickness of 100 µm was obtained by the same method as Example 3, except that a base film was manufactured using only nylon 6 resin having a relative viscosity of 3.4 (sulfuric acid, 96% solution).

Comparative Example 4

A film for a tire inner liner was manufactured by the same method as Example 6, except that in the manufacturing process of a base film, c-caprolactam and polyoxyethylene diamine (Mn 2000) were used in the amount of 97 wt % and 3 wt %, respectively, and the adhesive layer was formed with a thickness of 1.0 µm.

Comparative Example 5

A film for a tire inner liner was manufactured by the same method as Example 6, except that in the manufacturing process of a base film, ε-caprolactam and polyoxyethylene diamine (Mn 2000) were used in the amount of 50 wt % and 50 wt %, respectively, and the adhesive layer was formed with a thickness of 1.2 µm.

Comparative Example 6

A base film was manufactured by the same method as Example 3, except that 60 wt % of a polyamide-based resin (nylon 6) with a relative viscosity (sulfuric acid, 96% solution) of 3.3 and 40 wt % of a copolymer resin having a weight-average molecular weight of 120,000 (including 80 wt % of a polyamide-based repeating unit and 20 wt % of a polyether-based repeating unit) were mixed.

Comparative Example 7

A base film was manufactured by the same method as Example 3, except that 20 wt % of a polyamide-based resin (nylon 6) with a relative viscosity (sulfuric acid, 96 solution) of 3.3 and 80 wt % of a copolymer resin having a weight-average molecular weight of 100,000 (including 20 wt % of polyamide-based repeating unit and 80 wt % of a polyether-based repeating unit) were mixed.

Experimental Examples 1-6

Measurement of Properties of a Film for a Tire Inner Liner

Experimental Example 1

Measurement of Absolute Weight-average Molecular Weight and Specific Refractive Index Increment (dn/dc)

Experimental Example 1-1

To measure absolute molecular weight, 2.192 g of tetramethylammonium chloride was weighed and introduced into a 1 L volumetric flask to prepare m-cresol/chloroform 1:4 (V/V).

To 0.050 g of each base film obtained in Examples 1 and 2 and Comparative Example 1, 10 ml of 0.02M-TMAC m-cresol/chloroform 1:4 (V/V) was added for complete dissolution.

Further, 0.45 μm of the solution including the completely dissolved base film was filtered through a syringe filter, and then loaded into a MALS autosampler. The specific measurement conditions are as follows.

(1) Specific Measurement Conditions
injection volume: 100 ul
injector Temp.: 40° C.
flow rate: 1 ml/min
eluent: m-cresol/chloroform 1:4 (V/V) (containing 0.02 mol tetramethyl ammonium chloride)

(2) Measurement of dn/dc

Measurement method of specific refractive index increment (dn/dc) is as follows.

To 1 L of a 1:4 mixed solvent of m-cresol and chloroform, 0.02 mol of tetramethyl ammonium chloride was added to prepare a solution. To 100 ml of the mixed solution, 2 g of each base film obtained in Examples 1 to 4 and Comparative Example 1 was added for complete dissolution, and then foreign substances were completely removed using a 0.45 um syringe filter. The obtained sample was diluted to prepare samples eaching having a concentration of 0.02 g/ml, 0.010 g/ml, 0.005 g/ml, and 0.002 g/ml, respectively, and refractive indexes of the samples according to the respective concentration were measured using a 0.45 μm syringe filter.

(3) dn/dc Sample Analysis Method
injection volume: 0.9 ml
injector Temp.: 40° C.
flow rate: 0.3 ml/min
eluent: m-Cresol+chloroform (1:4) solvent (containing 0.02 mol tetramethyl ammonium chloride)

TABLE 1

Results of Experimental Example 1
Base film

|  | Absolute weight-average molecular weight | dn/dc [mL/g] |
|---|---|---|
| Example 1 | 314,400 | 0.1143 |
| Example 2 | 778,100 | 0.0790 |
| Comparative Example 1 | 102,100 | 0.1410 |
| Comparative Example 2 | 1,102,100 | 0.0589 |

Experimental Example 1-2

The specific refractive index increment (dn/dc) of each base film obtained in Examples 3 to 6 and Comparative Examples 3 to 7 was measured. Each of the base film obtained in the examples and comparative examples was cut into a small piece to form a shape through which a solvent may easily penetrate, and the piece was added to an organic solvent, and then injected into a flow cell of a differential refractometer in a diluted solution state, and subsequently refractive indexes were measured. At this time, the differential value of the change rate of the refractive index according to the change rate of the concentration of the diluted solution was determined as the specific refractive index increment, which was measured in the concentration change section of 0.002 to 0.02 g/ml.

In detail, the specific refractive index increment was measured as follows.

(1) Pretreatment of Sample for Measuring dn/dc

To 1 L of a 1:4 mixed solvent of m-cresol and chloroform, 0.02 mol of tetramethyl ammonium chloride was added to prepare a solution. To 100 ml of the mixed solution, 2 g of each base film obtained in the examples and comparative examples was added for complete dissolution, and then foreign substances were completely removed using a 0.45 um syringe filter. The obtained sample of was diluted to prepare samples having concentrations of 0.02 g/ml, 0.010 g/ml, 0.005 g/ml, and 0.002 g/ml, respectively, and refractive indexes of the samples according to the concentrations were measured using a 0.45 μm syringe filter.

(2) dn/dc Sample Analysis Method
injection volume: 0.9 ml
injector Temp.: 40° C.
flow rate: 0.3 ml/min
eluent: m-Cresol+chloroform (1:4) solvent (containing 0.02 mol tetramethyl ammonium chloride)

The measured specific refractive index increments (dn/dc) are shown in the following Table 1-2.

TABLE 1-2

Measurement results of specific refractive index increment (dn/dc)
Base film

|  | Thickness (um) | dn/dc [mL/g] |
|---|---|---|
| Example 3 | 80 | 0.1107 |
| Example 4 | 80 | 0.0928 |
| Example 5 | 80 | 0.0798 |
| Example 6 | 100 | 0.0919 |
| Comparative Example 3 | 100 | 0.1458 |
| Comparative Example 4 | 100 | 0.1432 |
| Comparative Example 5 | 100 | 0.0253 |
| Comparative Example 6 | 80 | 0.1410 |
| Comparative Example 7 | 80 | 0.0543 |

As shown in the Table 6-1, it was confirmed that the base films obtained in Examples 3 to 6 have a specific refractive index increment of 0.0710 to 0.1107 mL/g (1:4 mixed solvent of m-cresol and chloroform including 0.02M of tetramethyl ammonium chloride, 40° C.).

Experimental Example 2

Oxygen Permeability Test

Oxygen permeability of the tire inner liner films obtained in the Examples and Comparative Examples was measured. The specific measurement method is as follows.

(1) Oxygen permeability: measured according to ASTM D 3895, using Oxygen Permeation Analyzer (Model 8000, Illinois Instruments Company) under a 25° C. 60 RH % atmosphere.

Experimental Example 3

Measurement of Internal Pressure Retention

Tires were manufactured using the tire inner liner films of the Examples and Comparative Examples, applying the 205R/65R16 standard. Further, 90-day IPRs (internal pressure retention) of the tires were measured and compared/evaluated as shown in the following Equation 2, under the temperature of 21° C. and the pressure of 101.3 kPa according to ASTM F 1112-06.

$$\text{Internal pressure retention (\%)} = \left\{1 - \frac{\text{Internal pressure of the tire at first evaluation} - \text{Internal pressure of the tire after standing for 90 days}}{\text{Internal pressure of the tire at first evaluation}}\right\} * 100 \quad \text{[Equation 2]}$$

Experimental Example 4

Measurement of Maximum Load Per Unit Thickness of Base Film at 100% Elongation Maximum load at 100% elongation in MD (Machine Direction) of each base film obtained in the Examples and Comparative Examples was measured. The measured maximum load was divided by the thickness of a film to calculate the maximum load per unit thickness.

Experimental Example 5

Measurement of Formability

Tires were manufactured using the tire inner liner films of the Examples and Comparative Examples, applying the 205R/65R16 standard. During the tire manufacturing process, manufacturability and appearance were evaluated after manufacturing a green tire, and then the final appearance of the tire was examined after vulcanization.

The final appearance was evaluated as "good" when there is no distortion on a green tire or a tire after vulcanization, and the standard deviation of the diameter was within 5%. It was evaluated as "defective shape" when distortion of a green tire or a tire after vulcanization was generated and thus a tire was not properly manufactured, the inner liner in the tire was dissolved or torn and damaged, or the standard deviation of the diameter was greater than 5%.

The results of Examples 2 to 5 are shown in the following Table 2.

TABLE 2

Results of Experimental Examples 2 to 5

| | Load at 100% elongation at room temperature (kgf)/ Load per unit thickness at 100% elongation at room temperature (gf/um) | Manufactured state of green tire/ State of final tire | Oxygen permeability cc/(m$^2$ · 24 h · atm) | 90 day internal pressure retention (%) |
|---|---|---|---|---|
| Example 1 | 1.36/17.1 | good/good | 50.4 | 96.6 |
| Example 2 | 1.28/16.5 | good/good | 85.2 | 94.3 |
| Example 3 | 1.37/17.1 (thickness of base film 80 um) | good/good | 65.4 | 96.5 |
| Example 6 | 1.30/16.8 (thickness of base film 100 um) | good/good | 84.3 | 97.4 |
| Comparative Example 1 | 4.12/42 | shape faulty | 30.2 | — |
| Comparative Example 2 | 1.02/11.2 | good/good | 625 | 87 |
| Comparative Example 4 | 3.8/38 (thickness of base film 100 um) | shape faulty | 43 | — |
| Comparative Example 5 | 0.86/8.6 (thickness of base film 100 um) | good/good | 457 | 92.5 |

Specific Measurement Method is as Follows.

(1) Measuring device: Universal testing machine (Model 4204, Instron Corp.)

(2) Measurement conditions:
 i) Head Speed 300 mm/min,
 ii) Grip Distance 100 mm,
 iii) Sample Width 10 mm,
 iv) Measured under 25° C. and 60 RH % atmosphere (3) Each film was measured 5 times, and the average of the obtained results was calculated.

As shown in the Table 2, in the Examples, a base film layer having uniform properties throughout the film may be formed, and a film for a tire inner liner of the Examples using the base film layer may have excellent formability, high gas barrier properties, and internal pressure retention.

Further, the tire inner liner films obtained in the Examples exhibit oxygen permeability of 200 cc/(m$^2$·24 h·atm) or less, showing excellent gas barrier properties, and maintain a load per unit thickness of 10 to 20 gf/um at 100% elongation. Such results shows that the films obtained in the Examples have appropriate formability in the manufacturing process, excellent fatigue resistance to repeated deformations while having sufficient mechanical strength during automobile operation.

In addition, the tires manufactured using the tire inner liner films of the Examples maintain 90-day IPR (internal pressure retention) of 95% or more, as measured according to ASTM F1112-06 under a 21° C. and 101.3 kPa, thus promoting fuel efficiency, and preventing automobile accidents such as rollovers caused by low internal pressure.

To the contrary, it was confirmed that the tire inner liner films obtained in the Comparative Examples have significantly lowered gas barrier properties (Comparative Examples 2 and 5), or a large load per unit thickness at 100% elongation at room temperature, and thus appropriate formability may not be secured or desired properties of the film may be lowered due to repeated deformations during the tire manufacturing process (Comparative Examples 1 and 4).

Experimental Example 6

Peel-test of Tire Inner Liner Film

The adhesion of the tire inner liner films obtained in the Examples and Comparative examples to a tire carcass layer was measured according to ASTM D 4394.

Specifically, a 1.6 mm rubber sheet, cord, the film for a tire inner liner, a 1.6 mm rubber sheet, cord, and a 1.6 mm rubber sheet were sequentially laminated in order and then vulcanized at a pressure of 60 kg/cm² at 150° C. for 30 minutes. The vulcanized sample was then cut to a width of 1 inch.

The 1.6 mm rubber sheet, cord, and 1.6 mm rubber sheet form a carcass layer, and the rubber sheet was manufactured using a rubber composition as described in the following Table 3.

TABLE 3

| Composition of rubber sheet | |
|---|---|
| Ingredient | Content (part by weight) |
| Natural rubber | 100 |
| Zinc oxide | 3 |
| Carbon black | 29.8 |
| Stearic acid | 2.0 |
| Pine Tar | 7.0 |
| Mercaptobenzothiazole | 1.25 |
| Sulfur | 3.0 |
| Diphenylguanidine | 0.15 |
| Phenylbetanaphthalamine | 1.0 |
| Total | 147.2 |

Further, the cut sample was peeled at a speed of 300 mm/min at 25° C. using Universal Testing Machine (Instron Corp.), adhesion force (kgf) of the inner liner film to a carcass layer was measured twice, and the mean value was calculated. The mean value of the load generated at peeling was determined as an adhesion force.

TABLE 4

| Results of Experimental Examples 4 to 6 | |
|---|---|
| | Adhesion Force (kgf) |
| Example 2 | 22.4 |
| Example 6 | 24.0 |
| Comparative Example 4 | 13.0 |
| Comparative Example 5 | 15.8 |

As shown in the Table 4, the tire inner liner films of Examples have an adhesion force to a tire carcass layer of 20 kgf or more, as measured by ASTM D 4394, thus confirming that the tire inner liner films of Examples may be very uniformly and strongly bonded to a tire carcass layer. Further, if the tire inner liner films of Examples are used, even if the expansion pressure is applied during a tire manufacturing process, sufficient stretching may be achieved, thus affording a good manufactured state of a green tire or a final tire.

To the contrary, the tire inner liner films of Comparative Examples 4 and 5 do not have a sufficient adhesion force to a tire carcass layer.

What is claimed is:

1. A film for a tire inner liner, comprising:
a base film layer comprising a polyamide-based resin and a copolymer comprising a polyamide-based segment and a polyether-based segment; and
an adhesive layer formed on at least one side of the base film layer and comprising a resorcinol-formalin-latex (RFL)-based adhesive, and
the base film layer has an absolute weight-average molecular weight of 50,000 to 1,000,000.

2. The film for a tire inner liner according to claim 1, wherein the base film has a specific refractive index increment (dn/dc) of 0.04 to 0.14 mL/g at a temperature of 40 ° C. using a 0.02 M of tetramethyl ammonium chloride containing 1:4 mixed solvent of m-cresol and chloroform.

3. The film for a tire inner liner according to claim 1, wherein the polyamide-based resin has a relative viscosity (sulfuric acid, 96% solution) of 3.0 to 3.5.

4. The film for a tire inner liner according to claim 1, wherein the copolymer comprising the polyamide-based segment and the polyether-based segment has an absolute weight-average molecular weight of 50,000 to 1,000,000.

5. The film for a tire inner liner according to claim 1, wherein the polyamide-based segment of the copolymer comprises a repeating unit of the following Chemical Formula 1 or Chemical Formula 2:

[Chemical Formula 1]

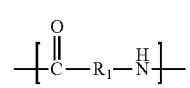

in Chemical Formula 1, $R_1$ is a C1-20 liner or branched alkylene group or a C7-20 liner or branched arylalkylene group,

[Chemical Formula 2]

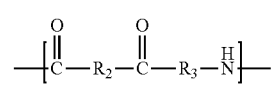

in Chemical Formula 2, $R_2$ is a C1-20 linear or branched alkylene group, and $R_3$ is a C1-20 linear or branched alkylene group or a C7-20 liner or branched arylalkylene group.

6. The film for a tire inner liner according to claim 1, wherein the polyether-based segment of the copolymer comprises a repeating unit of the following Chemical Formula 3:

[Chemical Formula 3]

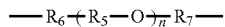

in Chemical Formula 3, $R_5$ is a C1-10 linear or branched alkylene group, and n is an integer of from 1 to 100, and $R_6$ and $R_7$ may be identical or different, and are independently a direct bond, —O—, —NH—, —COO—, or —CONH—.

7. The film for a tire inner liner according to claim 1, wherein a weight ratio of the polyamide-based segment and the polyether-based segment is 6:4 to 3:7.

8. The film for a tire inner liner according to claim 1, wherein a weight ratio of the polyamide-based resin and the copolymer is 6:4 to 3:7.

9. The film for a tire inner liner according to claim 1, wherein the base film layer has a thickness of 30 to 300 μm, and the adhesive layer has a thickness of 0.1 to 20 μm.

10. The film for a tire inner liner according to claim 1, wherein the base film layer is an unstretched film.

11. The film for a tire inner liner according to claim 1, wherein the resorcinol-formalin-latex (RFL)-based adhesive comprises 2 to 30 wt % of a condensate of resorcinol and formaldehyde, and 68 to 98 wt % of latex.

12. The film for a tire inner liner according to claim 1, wherein the content of the polyether-based segment of the copolymer is 15 to 50 wt % based on the total weight of the base film layer.

\* \* \* \* \*